July 25, 1939. M. H. P. SOLOGAISTOA 2,166,976
DRIVE MECHANISM FOR LOCOMOTIVES OR OTHER VEHICLES, ENGINES, OR MACHINERY
Filed Oct. 10, 1936 3 Sheets-Sheet 1
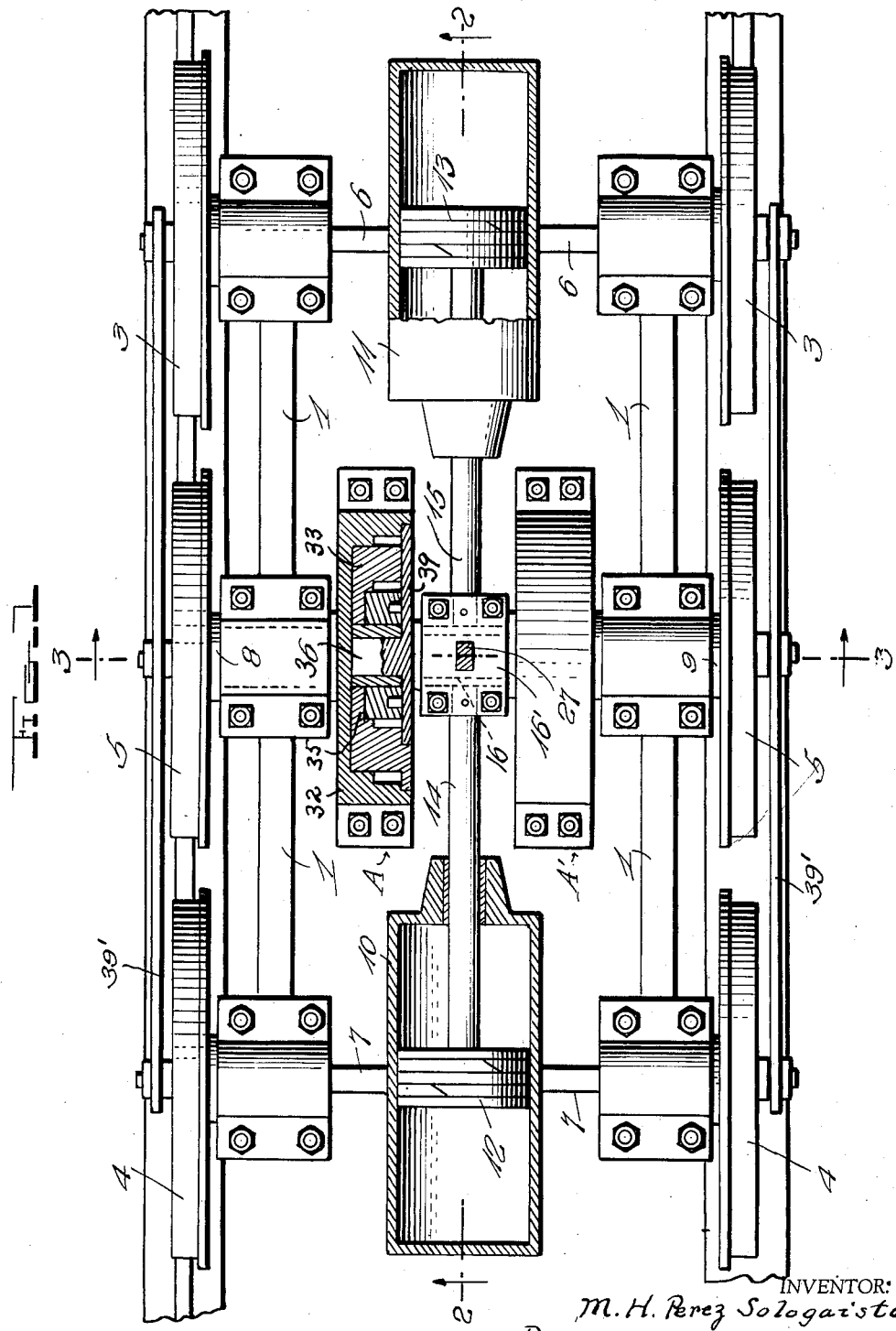
INVENTOR:
M. H. Perez Sologaistoa,
By C. C. Hinero,
ATTORNEY.

July 25, 1939. M. H. P. SOLOGAISTOA 2,166,976
DRIVE MECHANISM FOR LOCOMOTIVES OR OTHER VEHICLES, ENGINES, OR MACHINERY
Filed Oct. 10, 1936   3 Sheets—Sheet 2
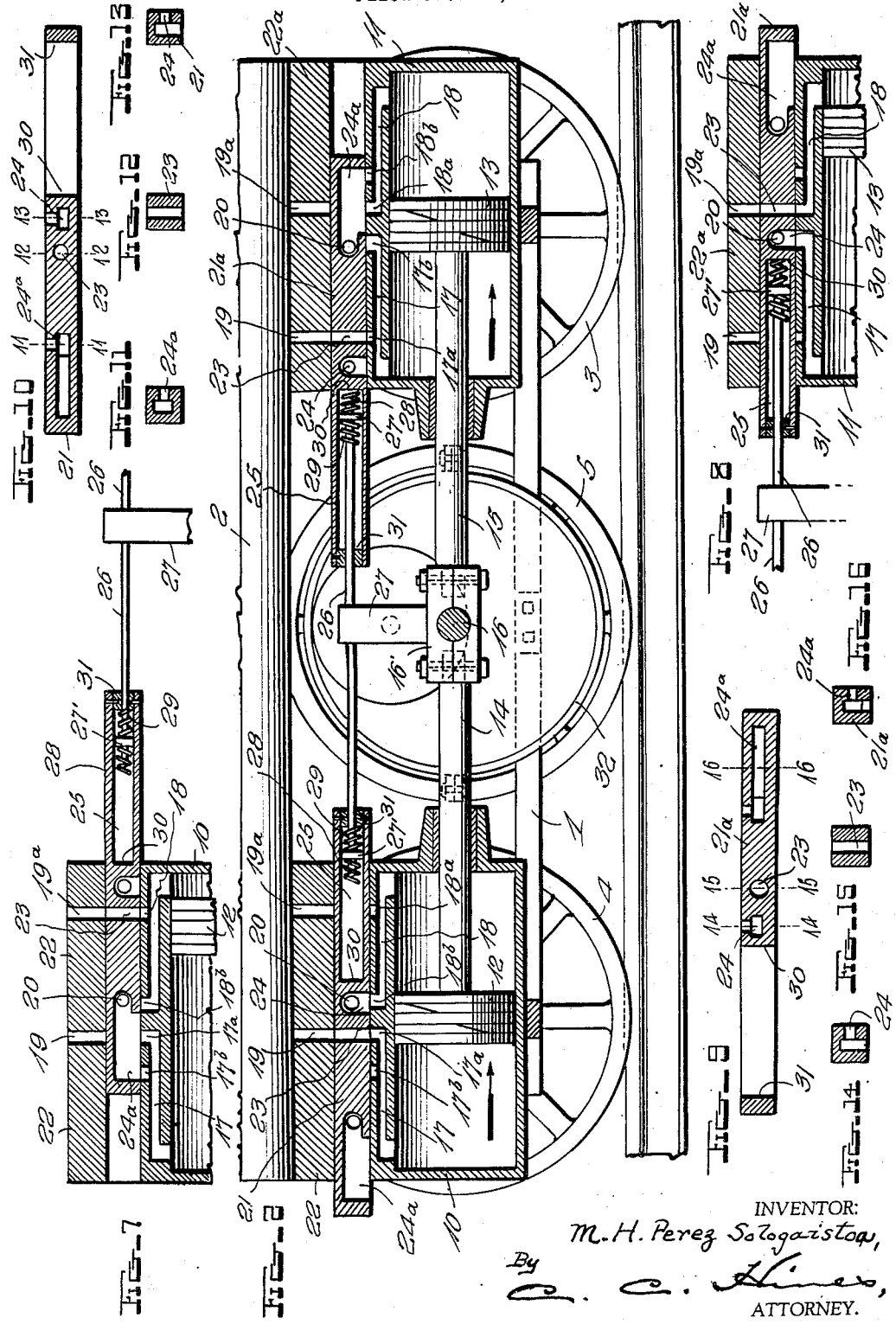
INVENTOR:
M. H. Perez Sologaistoa,
By
C. C. Hines,
ATTORNEY.

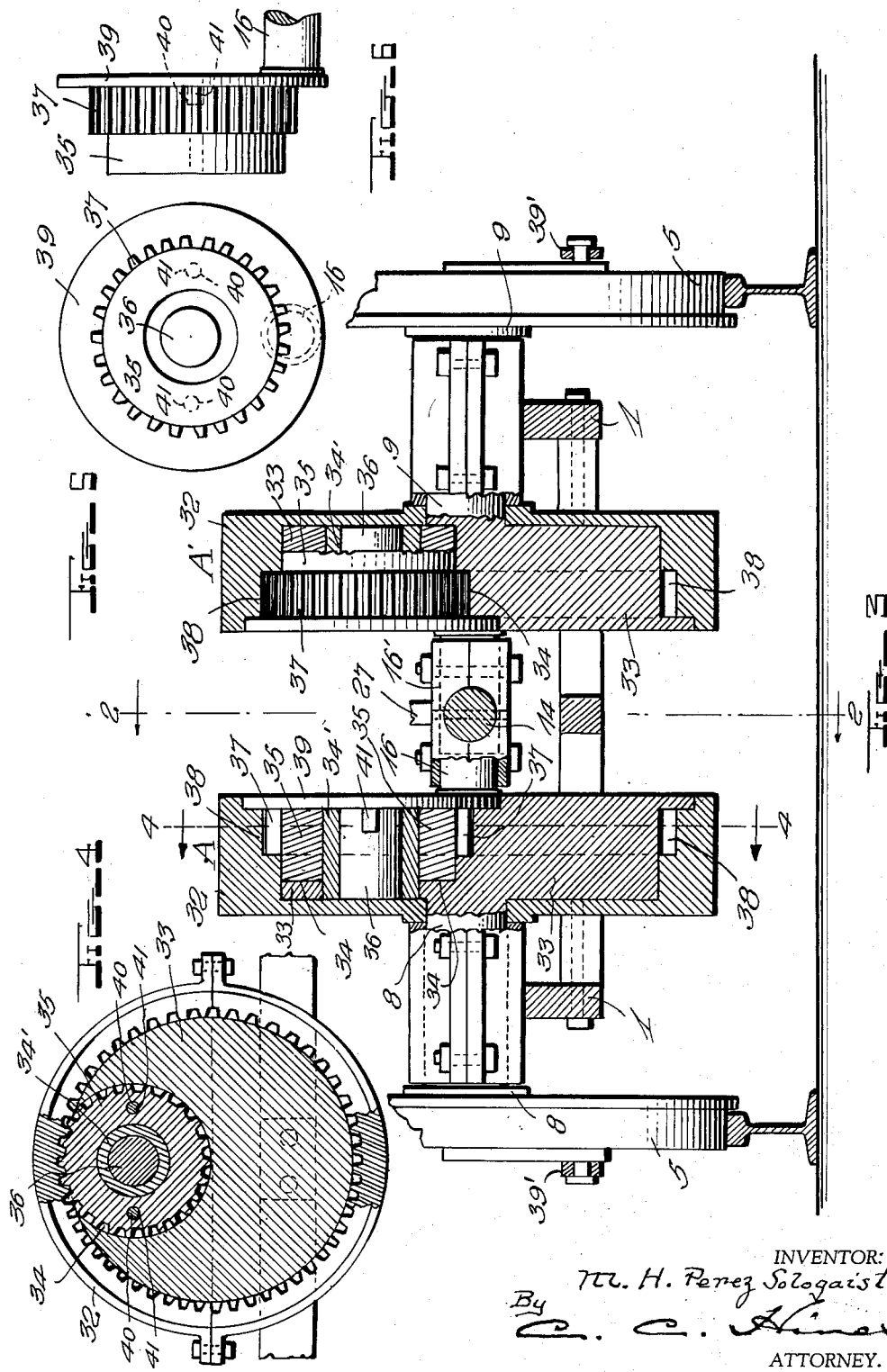

Patented July 25, 1939

2,166,976

UNITED STATES PATENT OFFICE 2,166,976

DRIVE MECHANISM FOR LOCOMOTIVES OR OTHER VEHICLES, ENGINES, OR MACHINERY

Manuel Humberto Perez Sologaistoa, San Pedro Sula, Honduras

Application October 10, 1936, Serial No. 105,097

6 Claims. (Cl. 105—96)

This invention relates to improvements in drive mechanisms for locomotives or other vehicles, engines or machinery, and particularly to drive mechanism of that type employing a reciprocatory member or members, such as a piston or pistons, in conjunction with motion transmitting means for transmitting power therefrom to a rotary member or members to be driven.

One object of the invention is to provide a drive mechanism embodying novel motion transmitting means by which action may be transmitted from a piston or pistons to a rotary element or elements while the rod or rods of the piston or pistons is or are permitted to reciprocate in a direct line and without angularity of motion, thus simplifying the construction, allowing a longer power stroke and preventing piston slap and reducing friction and other power losses and other objections incident to the use of ordinary crank drives in which angularly movable connecting rods for the transmission of motion from a piston to a driving crank are employed.

A further object of the invention is to provide a driving mechanism for locomotives, trucks and machinery, of simple and compact type whereby maximum driving power may be obtained from a set of opposed double acting reciprocating motors in which the piston rods are coupled for conjoint motion and operate in a straight line to transmit motion through a novel motion transmitting means to the drive wheels of the engine or truck or to rotary power transmitting elements of machinery.

A still further object of the invention is to provide a novel and improved driving mechanism of such character for the drive wheels of locomotives, whereby greater power may be obtained by utilizing the full forces of pressure and expansion of the steam or other fluid pressure power medium employed.

With these and other objects in view, the invention consists of the features of construction, combination and arrangement of parts, hereinafter fully described and claimed, reference being had to the accompanying drawings, in which:

Fig. 1 is a sectional plan view of the frame and drive mechanism of a locomotive embodying my invention.

Fig. 2 is a vertical longitudinal section taken substantially on line 2—2 of Fig. 1 showing the piston in mid-position on a stroke in one position and showing the crank mechanism at a corresponding one-quarter point in the orbit of rotation of the crank disks.

Fig. 3 is a transverse section taken substantially on line 3—3 of Fig. 1.

Fig. 4 is a section on line 4—4 of Fig. 3.

Fig. 5 is a rear elevation of one of the small eccentric or crank disks.

Fig. 6 is a side elevation of the same.

Figs. 7 and 8 are views showing the pistons of the valves of the left and right hand cylinders at the beginning of the reverse stroke shown in Figs. 1 and 2.

Figs. 9 and 10 are horizontal sections through the valves of the cylinders.

Figs. 11, 12 and 13 are transverse sections through the valve of one cylinder and Figs. 14, 15 and 16 are similar sections through the valve of the other cylinder.

Referring now more particularly to the drawings, 1 designates the frame and 2 the boiler of a steam locomotive, to which the invention is shown in the present instance applied. The locomotive may be one of conventional type, modified to suit the application of the drive mechanism, and only such details of the locomotive structure are shown as are necessary to illustrate the application of the invention.

The locomotive is shown as having six driving wheels, arranged in pairs, a front pair 3, a rear pair 4, and an intermediate pair 5, the wheels of each pair being arranged on opposite sides of the center of the locomotive for travel on the respective track rails. The front and rear pairs of wheels 3 and 4 are mounted for rotation upon front and rear axles 6 and 7, while the intermediate wheels 5 are mounted upon shaft or axle sections 8 and 9 coupled for driving motion in the manner hereinafter described.

Mounted on the locomotive frame upon the dropped central portions 6' and 7' of the axles 6 and 7 are cylinders 10 and 11, respectively, in which operate pistons 12 and 13, respectively, which pistons have rigidly connected therewith rods 14 and 15 arranged in alinement with each other and connected at their inner ends to each other and to a driving crank 16 by a crank bearing 16'. The motors formed by the cylinders and pistons are of double acting type and each cylinder is provided at each of its ends with passages 17 and 18, the passage 17 connecting with intake and exhaust ports 17a, 17b and the passage 18 with intake and exhaust ports 18a, 18b, for the supply of live fluid pressure to and the exhaust of spent fluid pressure from each end of the cylinder, the intake ports being supplied with steam through feed passages 19, 19a from the locomotive boiler and the ports 17b, 18b being adapted for connection with exhaust passages 20 leading from the respective valve chambers to the atmosphere.

Slide valves 21, 21a mounted in the casings 22, 22a are provided for governing the supply of fluid pressure to and its exhaust from the ends of each cylinder, each valve having a live steam feed port 23, an exhaust port 24 for cooperation with the port 20 in one position of the valve and an angular exhaust passage 24a for cooperation with the port 20 in another position of the valve, the arrangement of these ports being such that when the feed port 23 of valve 21, for example, is in communication with the passage 19 and the intake port 17a, the exhaust port 17b will be blanked, while at the same time the exhaust port 24 of said valve will be in communication with the exhaust ports 18b and 20 and the ports 18a, 19a and 24 will be blanked or out of operation. With the ports of valve 21 in such positions port 23 of valve 21a will register with passage 19 and port 20 and port 24a will register with port 18b, the other ports of said valve being blanked or out of operation. With the valve ports of the valves 21 and 21a in such positions motive fluid will be supplied to the left hand ends of the cylinders to drive the pistons on their working stroke to the right in the cylinders. These positions of the valves are shown in Fig. 2 which illustrate the pistons at the mid point of their stroke to the right, which point is a point of cut off of supply of the motive fluid, from which point the pistons are impelled on the remainder of such stroke by expansion of the fluid. In the reverse or opposite working position of valve 21, as shown in Fig. 7, port 23 of said valve registers with steam supply passage 19a and port 18a, and exhaust port 24a in the valve connects with exhaust ports 17b and 20 in the valve casing, for supplying live motive fluid to the right hand end of cylinder 10 and exhausting spent fluid from the left hand end of said cylinder. At the same time valve 21a will be in such position, as shown in Fig. 8, as to bring its port 23 into register with passage 19a and port 18a to supply live motive fluid to the right hand end of cylinder 11 and its port 24 will connect ports 17b and 20 to exhaust spent fluid from the left hand end of said cylinder. Figs. 7 and 8 show the reverse working positions of the valves from those shown in Fig. 2 to supply motive fluid to the cylinders to drive the pistons on their working stroke to the left in said cylinders, the pistons being shown therein in the positions they occupy at the beginning of such stroke. Thus provision is made for simultaneously supplying motive fluid to like ends of the cylinders, and alternately to opposite ends of the cylinders, for power impelling the pistons in each direction, and the operation of the valve mechanism is such, as I will now proceed to describe, whereby each piston is impelled a portion of each stroke by direct pressure of the motive fluid, the supply of which at half stroke is cut off, and is impelled during the remainder of the stroke by expansion of the fluid, thus allowing all the available power of the fluid to be used and waste of such power prevented.

The inner ends of the valves are chambered or recessed, as at 25, to slidably receive the ends of a valve controlling rod 26 which is rigidly connected at its center with a projection 27 extending upward from the crank bearing 16' so that the rod will reciprocate with the piston rods. Each end of the rod 26 arranged within a valve end 25 is provided with a collar or head 27', spaced a short distance from the end thereof, and disposed about the rod on opposite sides of the collar or head 27' are abutment springs 28, 29, serving also as cushioning springs and adapted for abutting engagement with the end walls 30, 31 of the recess 25.

The operation of this valve actuating mechanism is as follows: Fig. 2 shows the pistons at a mid point position on their right hand strokes to which they have been driven by direct pressure of the motive fluid, at which time the valves are at their extremes of movement in a left hand direction, to which they have been moved by the actuating rod, and about to be moved in a right hand direction to first cut off the supply of fluid to the cylinders to effect movement of the pistons to the ends of their right hand stroke by expansion of the fluid and to then admit fluid to the right hand end of the cylinders to effect travel of the pistons on their opposite or left hand stroke. The crank mechanism is now at a center point in the orbit of rotation of the crank disks and the left hand end of the rod 26 is in position to shift valve 21 to the position shown in Fig. 7 by engagement of its spring 29 with the end wall 31 of the recess of said valve, while the right hand end of the rod 26 is in position to shift valve 21a to the position shown in Fig. 8 by engagement of its spring 28 with the end wall 30 of recess 25 of said valve, which shifting movement of the valve occurs during the completion of the right hand stroke of the pistons and the travel of the crank mechanism during the same period of time. The valves while being shifted to the positions shown in Figs. 7 and 8 cut off the supply of fluid to the left hand ends of the cylinders until they reach the positions shown in Figs. 7 and 8 and begin to admit fluid to the right hand ends of the cylinders to drive the pistons on the reverse stroke or to the left. The valves are left in the positions shown in Figs. 7 and 8 to admit fluid to the right hand ends of the cylinders until the pistons reach the mid points of their left hand strokes, which is permitted by lost motion of the rod ends in the chambers until the springs 28 and 29 at the left and right hand ends of the rod are in position to engage the end walls 30 and 31 of the recesses in the respective valves 21 and 21a, at which time they will be shifted on the combined movements of the pistons to the left back to the positions shown in Fig. 2 by engagement of said springs with said end walls, thus effecting the driving of the pistons by fluid expansion during the second half of their left hand strokes. Motive fluid will now be admitted again to the left hand ends of the cylinders to drive the same to the right and during the first half of the stroke the valves will be permitted to retain their positions shown in Fig. 2 by reason of the lost motion travel of the rod ends in the valve recesses on the first half of the right hand strokes of the pistons and until the rod ends again reach their positions shown in Fig. 2, whereupon the valves will be shifted to the positions shown in Figs. 7 and 8 for a repetition of the operations above described.

In accordance with my invention a novel motion transmitting mechanism is provided for driving the shaft or axle sections 8 and 9 through the crank 16 from the piston rods 14, 15, to convert the reciprocatory motion of the latter into rotary motion of the former, through a straight line drive motion of the piston rods and crank. This mechanism comprises a pair of motion transmitting devices A, A', associated with the respective axle sections 8 and 9 and each consisting of a stationary casing 32 fixed to the locomotive frame and within which rotates an eccentric head or disk 33 fixed at one side to the shaft or axle section 8 or 9 as the case may be. The opposite side of this disk 33 is formed with a recess 34 eccentric to its axis. Disposed to fit and rotate in this recess is a smaller eccentric or crank disk 35. This smaller eccentric or disk 35 may be of any suitable construction, but as shown is of sectional construction and comprises an annular body portion or member, constituting the eccentric proper 35, and a face plate portion or member 39, which latter is fixed eccentrically to the crank 16. The two members 35 and 39 are fixed together for unitary rotation by means of a stud 36 extending into the opening in the annular member 35, which stud and adjacent portions of the plate 39 are provided with dowel projections 41 located at diametrically opposite sides of the stud and engaging dowel seats or recesses 40 formed in the member 35, whereby said members are coupled to rotate together but may be disconnected in an obvious manner. The stud 36 may be of the same diameter as the opening in the annular member 35 so as to fit tightly therein, but is herein shown as of smaller diameter than the opening so as to permit of the reception of a tightly fitting bushing ring 34' between said stud and the wall of the opening. This tightly fitting bushing ring forms an additional coupling connection between the member 35 and stud 36, as well as a sealing agent to prevent leakage of lubricant from between the bearing surfaces of the members 34 and 35 into the space between the stud and member 34. The recess 34 as shown opens at one side through the periphery of the disk 33 so that a portion of the disk 35 is exposed and projects through this opening for engagement of an annular series of peripheral teeth 37 on the disk 38 with an annular series of internal gear teeth 38 on the stationary casing 32. By this construction the disks 35 of the devices A, A', which are coupled through their plate members 39 to the crank pin 16, form crank and drive gears whose teeth 37 mesh with the fixed internal gears 38 on the casings 32, which crank connection effects the transfer of driving motion from the rods 14, 15 through the oscillatory crank 16 to the shaft sections 8, 9, and which gear connection converts the oscillatory motions of the crank 16 into a timed rotation of the disks 33 and 35 such as to shift the disks 35 from side to side of the line of motion of the rods 14, 15, whereby to constantly maintain the crank 16 in alinement with the rods, thus forming a motion transmitting and compensating means allowing said rods to have a reciprocating movement in a straight line, which motion is converted into rotary motion of the shafts or axle 8, 9. Figs. 1, 2 and 3 illustrate the position of the parts of the motion transmitting means and crank shaft in the cycle of operation of the pistons, showing the arrangement when the pistons at the intermediate point of a stroke in one direction, from which it will be seen that as the piston rods reciprocate back and forth the disks 35 are shifted by the gears to maintain the crank as it rotates in the line of the rods.

This obviates the necessity of employing pivotally connected rods, with their objectionable angularities of movement causing excessive wear and tear on the motor parts and friction and other power losses. It also allows the rods to be fixed to the pistons so that the ends of the cylinders through which they move may be sealed by stuffing boxes or the like, whereby both ends of the cylinder may be employed for power purposes, or, in other words, employed in conjunction with the pistons as a double action motor, so that a motor of greatly increased power is provided. This construction of motion transmitting means further provides for the use of a long stroke motor, to still further increase the power, and a control of the power fluid employed so that on each power stroke of the piston the piston may be impelled during a portion of its stroke by the direct working power of the fluid, and thereafter during the entire remainder of its stroke by expansion of the fluid, thus avoiding all power losses resulting from power wastes. While the present disclosure applies to the use of the invention on a steam locomotive, and the utilization of both the initial pressure and the expansive forces of the steam, it is to be understood that the invention may be embodied in a drive mechanism using internal combustion motors of double acting type, and which would involve only such structural changes as are required for effecting ignition of the fuel charges. The invention thus while particularly shown as adapted for use on a steam locomotive for driving the driving wheels thereof, may also be employed for driving trucks or other types of vehicles or in connection with machinery for driving the working parts thereof through the use of internal combustion motors. It will be obvious that the wheels 5 of the locomotive will be directly driven by the shaft sections 8, 9, from the power piston, and power may be transmitted from these wheels to the wheels 3 and 4 by any suitable means, as by the use of interconnecting driver rods 39' uniting said cranks on the wheels. Other types of driving means, such as sprocket drive chains or other gearing, may be employed in the case of the use of the invention in connection with trucks or other vehicles, and chains or belting may be employed where the invention is used for the driving of machine elements. In case of the use of the invention on a locomotive or other vehicle, suitable connections between the shafts and wheels or other suitable means may be employed to allow differential motions for steering or other purposes or to adapt the wheels to readily negitiate curves.

It will be observed that the two-part construction of the eccentrics 35 is such as to adapt the face plate members 39 thereof to serve as closures or cover plates for the outer sides of the recess 34 in the eccentrics 33. This construction also, for greater convenience of manufacture and assemblage of parts, allows the two face plates 39 of the gears 35 to be joined by a one-piece crank 16 whereby a unitary construction of the two face plates and the drive crank is provided. By this means the number of individual parts is reduced and a stronger construction of crank connection produced.

From the foregoing description, taken in connection with the drawings, the construction and mode of operation of my improved drive mechanism will be readily understood without a further and extended description, and it will be seen that the invention provides a drive mechanism which is simple of construction and enables a straight line motion of the connecting rods of motor pistons to be converted into rotary motion of axles, shafts, or other like parts to be driven through intervening crank mechanism, in which the crank moves in a straight line with the pistons. The advantages gained by the use of my invention will be readily understood and appreciated from the foregoing description, and it will be obvious that the improved driving mechanism as disclosed herein enables a compact and powerful driving organization for the drive wheels of a locomotive to be produced.

While the structure herein shown for purposes of exemplification is preferred, it will, of course, be understood that changes in the form, arrangement and proportions of the parts may be made within the scope of the appended claims, without departing from the spirit or sacrificing any of the advantages of the invention.

What I claim is:

1. In a driving mechanism of the character described, the combination of a pair of transversely alined drive wheels, shaft sections carrying said wheels, a pair of opposed double acting motor cylinders, reciprocating pistons operating in the cylinders, rods connected to the pistons, a bearing connection between the rods coupling them for motion in unison, a crank journaled in said bearing connection, a motion transmitting means between the crank and each shaft section comprising relatively movable elements operative to convert the reciprocatory motion of the rods into rotary motion of the shaft sections and to compensate for and allow the crank to move in a straight line with the rods as they reciprocate, valve mechanism governing the supply and exhaust of a working fluid to and from the ends of the cylinders, and means coupled to and operating in the action of the drive mechanism for actuating said valve mechanism.

2. In a drive mechanism of the character described, the combination of a pair of opposed longitudinally alined double acting motor cylinders, reciprocating pistons operating in said cylinders, rods connected with the pistons and to each other to reciprocate in unison, a crank journaled to the rods, a rotary shaft comprising alined sections arranged on opposite sides of said crank, and a motion transmitting device between the crank and each shaft section operative to maintain a straight line motion of the rods and to convert the reciprocatory motion thereof into rotary motion of the shaft sections, each device comprising a rotary member fixed to one of the shaft sections, a second rotary member mounted eccentrically on the first-named rotary member and connected to the crank, gearing for rotating the second-named rotary member relative to the first-named rotary member as said members jointly rotate for a shifting action of said second rotary member to compensate for and allow the crank to move in a straight line with the rods as they reciprocate, and valve mechanism coupled to and operating in the action of the drive mechanism for governing the supply and exhaust of a working fluid to and from the ends of the motor supply cylinders.

3. In a drive mechanism of the character described, the combination of a pair of opposed longitudinally alined double acting motor cylinders, reciprocatory pistons operating in said cylinders, rods connected with the pistons and to each other to reciprocate in unison, a crank journaled to the rods, a rotary shaft comprising alined shaft sections arranged on opposite sides of the crank, and a motion transmitting device between the crank and each shaft section operative to maintain a straight line motion of the rods and to convert said motion into rotary motion of the shaft sections, each device comprising a stationary housing disposed about the shaft section, a rotary member enclosed in the housing and fixed in the shaft section, a second rotary member coupled to the crank and journaled eccentrically upon the first-named rotary member and forming a driving connection therebetween, a gear connection between the housing and second-named rotary member for rotating the second-named rotary member relative to the first-named rotary member as said members jointly rotate for a shifting action of said second rotary member to compensate for and allow the crank to move in a straight line with the rods as they reciprocate, and valve mechanism coupled to and operating in the action of the drive mechanism for governing the supply and exhaust of a working fluid to and from the ends of the motor cylinders.

4. In a locomotive, the combination of a locomotive frame, front, rear and intermediate sets of drive wheels mounted on shafts carried by the frame, the intermediate shaft comprising longitudinally alined outer shaft sections and an intervening crank section, a pair of opposed longitudinally alined double acting motor cylinders arranged on opposite sides of the intermediate shaft, pistons operating in said cylinders, rods connected to the pistons and directly to the crank section of the intermediate shaft to reciprocate in unison, a motion transmitting means connecting said crank section with the outer shaft sections of the intermediate shaft embodying relatively movable elements operative for converting the reciprocatory motion of the rods and crank section of the intermediate shaft into rotary motion of said outer shaft sections while permitting the crank section to reciprocate with the rods, driving connections between the wheels at each side of the locomotive, and valve mechanism operative in the driving action of the drive mechanism for controlling the supply and exhaust of a working fluid to and from the ends of the cylinders.

5. In a locomotive, the combination of a locomotive frame, driving wheels, axles for driving the driving wheels, a pair of opposed cylinders, pistons operating in said cylinders, rods connected with the pistons and with each other to reciprocate in unison in a straight line, and motion transmitting devices between the rods and axles including a crank coupled to the rods to reciprocate therewith, a driving connection between the crank and each axle including a rotary element fixed to the axle and an eccentric journaled on the rotary element and coupled to the crank for rotating the former from the latter and for converting the reciprocatory motion of the rods and crank into rotary motion of the axle, and gearing for rotating the eccentric relative to the rotary element as said rotary element and eccentric jointly rotate to compensate for and allow the crank to move in a straight line with the rods as they reciprocate.

6. In a locomotive, the combination of a locomotive frame, a pair of transversely alined driving wheels, axles for driving the driving wheels, a pair of opposed cylinders, pistons operating in said cylinders, rods connected with the pistons and with each other to reciprocate in unison, a crank coupled to the rods, rotary motion transmitting members fixed to the axles, rotary motion transmitting members journaled eccentrically on the first-named rotary members and connected with the crank for operation thereby to rotate the first-named rotary members, and gearing for rotating the second-named rotary members with respect to the first-named rotary members as said first-named and second-named members jointly rotate to compensate for and allow the crank to move in a straight line with the piston rods as they reciprocate.

MANUEL HUMBERTO
PEREZ SOLOGAISTOA.